United States Patent
Huffer et al.

(10) Patent No.: US 7,279,205 B2
(45) Date of Patent: Oct. 9, 2007

(54) PACKAGING MATERIAL

(75) Inventors: Scott W. Huffer, Hartsville, SC (US); Jeffrey M. Schuetz, Florence, SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 09/778,334

(22) Filed: Feb. 7, 2001

(65) Prior Publication Data

US 2002/0106465 A1  Aug. 8, 2002

(51) Int. Cl.
B29D 22/00 (2006.01)
B29D 23/00 (2006.01)
B32B 1/08 (2006.01)
B32B 27/32 (2006.01)

(52) U.S. Cl. ............. 428/35.2; 428/40.1; 428/192; 428/345; 428/496

(58) Field of Classification Search ............. 428/36.8, 428/343, 355 BL, 355 EP, 356, 413, 492, 428/493, 495, 517, 36.6, 36.7, 36.91, 46.6, 428/195, 198, 35.2, 192, 345, 496, 40.1
See application file for complete search history.

(56) References Cited

U.S. PATENT DOCUMENTS

| | | | |
|---|---|---|---|
| 3,865,664 A | 2/1975 | Neumann | 156/192 |
| 4,008,115 A | 2/1977 | Fairbanks et al. | 156/267 |
| 4,070,262 A | 1/1978 | Guarino et al. | 204/159.24 |
| 4,070,497 A | 1/1978 | Wismer et al. | 427/44 |
| 4,071,425 A | 1/1978 | Guarino et al. | 204/159.24 |
| 4,072,592 A | 2/1978 | Due et al. | 204/159.15 |
| 4,177,310 A | 12/1979 | Steeves | 428/216 |
| 4,246,297 A | 1/1981 | Nablo et al. | 427/44 |
| 4,246,315 A | 1/1981 | Kopp et al. | 428/315 |
| 4,288,479 A | 9/1981 | Brack | 428/40 |
| 4,330,590 A | 5/1982 | Vesley | 428/336 |
| 4,384,026 A | 5/1983 | Moore et al. | 428/412 |

(Continued)

FOREIGN PATENT DOCUMENTS

CH   664 971 A   4/1988

(Continued)

OTHER PUBLICATIONS

Ref. No. XP 002194997; Database WPI, Derwent Publications Ltd., London, GB; AN2001-115102, Oct. 24, 2000.

(Continued)

Primary Examiner—Michael C. Miggins
(74) Attorney, Agent, or Firm—DLA Piper US LLP

(57) ABSTRACT

A packaging material, a method of making such a material, and a package made from such material, are disclosed. A substrate comprises at least one sheet of plastic material. An energy-curable coating is applied to one side of the substrate, which will be the outside of the eventual package. The energy-curable coating is cured by exposing it to an electron beam or other appropriate energy. A cold-seal cohesive coating is applied to the other side of the substrate. The package is formed by pressing together portions of the inside surface of at least one sheet of the material having the cold-seal cohesive coating on them to form a seal. Preferably, the cold-seal cohesive coating is applied only to those portions of the material that are to form seams in the eventual package.

20 Claims, 1 Drawing Sheet

U.S. PATENT DOCUMENTS

| | | | | |
|---|---|---|---|---|
| 4,410,560 A | 10/1983 | Kosterka | | 427/44 |
| 4,501,797 A | 2/1985 | Super et al. | | 428/349 |
| 4,577,205 A | 3/1986 | Shibata et al. | | 346/204 |
| 4,589,145 A | 5/1986 | Van Erden et al. | | 383/5 |
| 4,654,379 A | 3/1987 | Lapin | | 522/15 |
| 4,658,963 A | 4/1987 | Jud | | 206/632 |
| 4,786,552 A | 11/1988 | Sasaki et al. | | 428/355 |
| 4,810,745 A * | 3/1989 | Pike et al. | | 524/516 |
| 4,814,215 A | 3/1989 | Lautenschlaeger et al. | | 428/40 |
| 4,851,459 A | 7/1989 | Ramalingam | | 523/414 |
| 4,859,521 A | 8/1989 | Pike et al. | | 428/195 |
| 4,889,884 A | 12/1989 | Dust et al. | | 524/314 |
| 4,898,787 A | 2/1990 | Min et al. | | 428/480 |
| 4,902,370 A | 2/1990 | Dust et al. | | 156/327 |
| 5,019,202 A | 5/1991 | Kawahata et al. | | 156/277 |
| 5,030,302 A | 7/1991 | Jud et al. | | 156/164 |
| 5,070,121 A | 12/1991 | Hinterwaldner et al. | | 524/31 |
| 5,200,463 A | 4/1993 | Flakus | | 524/591 |
| 5,227,240 A | 7/1993 | Tilley et al. | | 428/412 |
| 5,258,225 A | 11/1993 | Katsamberis | | 428/331 |
| 5,271,968 A | 12/1993 | Coyle et al. | | 427/558 |
| 5,436,073 A | 7/1995 | Williams et al. | | 428/343 |
| 5,445,867 A | 8/1995 | Ogawa et al. | | 428/195 |
| 5,455,105 A | 10/1995 | Coyle et al. | | 428/215 |
| 5,468,542 A | 11/1995 | Crouch | | 428/215 |
| 5,482,780 A | 1/1996 | Wilkie et al. | | 428/515 |
| 5,486,426 A | 1/1996 | McGee et al. | | 428/516 |
| 5,489,473 A | 2/1996 | Wilkie | | 428/323 |
| 5,492,733 A | 2/1996 | D'Anna et al. | | 427/517 |
| 5,527,578 A | 6/1996 | Mazurek et al. | | 428/41.8 |
| 5,548,005 A | 8/1996 | Kurth et al. | | 523/414 |
| 5,567,773 A | 10/1996 | McGee et al. | | 525/221 |
| 5,582,342 A | 12/1996 | Jud | | 229/87.05 |
| 5,616,400 A | 4/1997 | Zhang | | 428/195 |
| 5,650,453 A | 7/1997 | Eckberg et al. | | 522/31 |
| 5,671,882 A | 9/1997 | Cerwinski et al. | | 229/87.08 |
| 5,674,626 A | 10/1997 | Khatib et al. | | 428/447 |
| 5,691,052 A | 11/1997 | Jones | | 428/355 |
| 5,725,909 A | 3/1998 | Shaw et al. | | 427/412.1 |
| 5,763,048 A | 6/1998 | Takahashi | | 428/147 |
| 5,776,604 A | 7/1998 | Lu et al. | | 428/343 |
| 5,783,266 A | 7/1998 | Gehrke | | 428/34.3 |
| 5,792,549 A * | 8/1998 | Wilkie | | 428/215 |
| 5,798,174 A | 8/1998 | Wilkie | | 428/347 |
| 5,804,301 A | 9/1998 | Curatolo | | 428/352 |
| 5,827,615 A | 10/1998 | Touhsaent et al. | | 428/463 |
| 5,888,649 A * | 3/1999 | Curatolo et al. | | 428/352 |
| 5,935,686 A | 8/1999 | Daelmans et al. | | 428/194 |
| 5,945,183 A | 8/1999 | Johnson | | 428/34.9 |
| 5,959,003 A | 9/1999 | Lo et al. | | 523/201 |
| 5,959,020 A | 9/1999 | Oliveri et al. | | 524/487 |
| 5,981,047 A | 11/1999 | Wilkie | | 428/215 |
| 5,981,650 A | 11/1999 | Zhao et al. | | 524/591 |
| 5,985,426 A | 11/1999 | Wilkie | | 428/215 |
| 5,990,234 A | 11/1999 | Stahovic et al. | | 524/839 |
| 6,001,892 A | 12/1999 | Weissberg et al. | | 522/107 |
| 6,007,666 A | 12/1999 | Bunch et al. | | 156/280 |
| 6,010,757 A | 1/2000 | Yamamoto et al. | | 428/1 |
| 6,022,612 A | 2/2000 | Wilkie | | 428/215 |
| 6,027,793 A | 2/2000 | Lohwasser et al. | | 428/216 |
| 6,228,486 B1 | 5/2001 | Kittel et al. | | 428/354 |
| 6,291,062 B1 | 9/2001 | Oshima et al. | | 428/323 |
| 6,337,113 B1 * | 1/2002 | Muggli et al. | | 428/35.2 |
| 6,339,666 B2 | 1/2002 | Szum et al. | | 385/128 |
| 6,395,822 B1 | 5/2002 | Edgington | | 524/523 |
| 6,426,507 B1 | 7/2002 | Rangwalla et al. | | 250/492.3 |
| 6,528,127 B1 * | 3/2003 | Edlein et al. | | 427/494 |
| 2002/0058758 A1 | 5/2002 | Culbertson et al. | | 525/191 |
| 2002/0100194 A1 | 8/2002 | Huffer et al. | | 40/310 |
| 2002/0119295 A1 | 8/2002 | Speer et al. | | 428/195 |
| 2002/0146525 A1 | 10/2002 | Huffer et al. | | 428/35.3 |
| 2002/0182435 A1 | 12/2002 | Migliorini et al. | | 428/626 |
| 2003/0027009 A1 | 2/2003 | Bray et al. | | 428/519 |

FOREIGN PATENT DOCUMENTS

| | | | |
|---|---|---|---|
| EP | 0 339 670 | | 4/1989 |
| EP | 0 737 593 | | 10/1996 |
| EP | 0 870 695 | | 10/1998 |
| EP | 0 870 695 A1 | | 10/1998 |
| GB | 2 156 362 | | 10/1985 |
| GB | 2 284 787 | | 6/1995 |
| GB | 2 298 818 | | 9/1996 |
| GB | 2 320 911 | | 7/1998 |
| JP | 03119531 | A * | 5/1991 |
| JP | 6-341097 | | 12/1994 |
| JP | 9-302264 | | 11/1997 |
| JP | 2000-238196 | | 9/2000 |
| JP | 2000-297218 | | 10/2000 |
| WO | 95/09876 | | 4/1995 |
| WO | WO96/29205 | | 9/1996 |
| WO | WO 00/35671 | | 6/2000 |
| WO | WO 00/53429 | | 9/2000 |
| WO | WO 00/94451 | | 12/2001 |
| WO | WO 01/94451 | | 12/2001 |

OTHER PUBLICATIONS

Ref. No. XP 002205356 (Derwent Publications Ltd., London, GB) of JP 04041563, dated Feb. 12, 1992.

Ref. No. XP 002219129 (Derwent Publications Ltd., London GB) of JP 2000043207, dated Feb. 15, 2000.

McIntyre, "UV-Cured Durable Top Coats: A Replacement for OPP & PET Film Laminations," Presented at Future-Pak 1997, Oct. 28-29, 1997 (together with MCTC-2138 & 2139 Data Sheets).

Morton Adhesives, Mor-Quik® 477 Coating Data Sheets (Feb. 22, 1998).

Morton Adhesives, Mor-Quik® 333 Coating Data Sheets (Sep. 2, 1998).

Fletcher, "New Lower-Voltage EB Systems for Curing Polymers and Coatings," Journal of Coatings Technology, vol. 65, No. 822, pp. 61-63 (Jul. 1993).

Ravijst, "Radiation Cure Applications in the Packaging Industry," Packaging India, pp. 107-109 (Dec. '97).

Guarino, "A Review of Properties and Uses of Radiation Curing for the Near Term and Future," 1990 Polymers, Laminations & Coatings pp. 891-893 (TAPPI Proceedings 1990).

Pierce & Stevens Corp., Miracure EB Curable Coatings, Product Brochure, "Formulated for Success: Coatings & Adhesives for Packaging and Graphic Arts" (Nov. 1998).

McIntyre, "Total Package Concept: Electron Beam Technology for Barrier, Adhesive, and Overcoat Applications," Presented at Future-Pak '95 (20 pages) (Sep. 13-15, 1995).

Harris, "UV Coating—beyond stick and shine," FlexoTech, pp. 21-22 (Jun. 1998).

Leach et al., The Printing Ink Manual, Chapter 11, pp. 636-677 (Fifth Ed., Kluwer Academic Publishers 1993).

Document entitled "Bottle Wrap Structures and Costs", showing a bottle wrap structure that may have been proposed at least as early as Feb. 14, 1997.

Document entitled "Bottle Wrap Structures and Costs", showing a bottle wrap structure that may have been proposed at least as early as Apr. 6, 1998.

Document entitled "Bottle Wrap Back Up Math", showing a cost savings analysis that may have been proposed at least as early as Jun. 16, 1998.

Japanese Patent Abstract, No. 02-117826, published May 1990.

Japanese Patent Abstract, No. 07-186514, published Jul. 1995.

Novelty Radiation Curable Silicone Acrylates with Extraordinary Features, Dr. Dietmar Wewers, Papaer 1, Radtech Europe Edinburgh 29th Sep.2 Oct. 1991.

UV/EB Paper Coatings; Old and New, D.J. Cyterski; Polymers, Laminations and Coatings Conference 1984, pp. 49-54.

Application & Film Formation: "UV and EB Curing," S.J. Bett et al., Jocca 1990.

Oberflächenveredelung mit UV-und EB-härtenden Silicon-Acryaten als Trennbeschichtung, Günter M. Miles, Coating Feb. 1996 (No English translation supplied).

Radiation-curable additives for coatings and printing inks, Karen Bowling et al., PCCJ, Aug. 1997.

Electron Beam Curing of Epoxy-Silicone Release Coatings, Stuart R. Kerr III, Adhesive Age, 1998.

Manufactures of Waterbase, UV+EB Curable Coatings, Varnishes and Adhesives; Bags, Multiwall & Others Move to High End Graphics, Cork Tech TalkNews; Apr. 2000.

Neue UV-härtbare System für Überzugslacke, Kaschier-und Haftklebstoffe; 21. Munchner Klebstoff-und Veredelungsseminar, 1996 (No English translation supplied).

Present Status of Radiation Processing in Asia; RadTech Asia 1991.

Silicone Acrylate System, Ebbrecht T. et al., EuroCoat, Sep. 1992.

Today's Electron Beam: A Competitive Advantage for Packaging, Edward F. Maguire, RadTech Report, Sep./Oct. 1997.

Cork Tech Talk News, "Bags, Multiwall & Others Move to High End Graphics", 1 p., Apr. 2000.

* cited by examiner

PACKAGING MATERIAL

FIELD OF THE INVENTION

The invention relates to a cold-sealable packaging material, especially to one suitable for packaging candy bars and other confectionery.

BACKGROUND OF THE INVENTION

Cold-sealable materials are known for packaging products that would be adversely affected by exposure to heat, such as might occur during heat-sealing of a package, after the product has been produced. Candy bars with an external chocolate coating are an example of such a product.

Previously used cold-seal packaging materials typically use one of two structures. One structure comprises a layer of white oriented polypropylene (OPP) material, with ink printing on the outside, covered by a layer of lacquer, and a rubber latex cold seal coating on the inside. Another structure comprises a laminate of a white OPP ply and a clear OPP ply, bonded together by an adhesive, with a rubber latex cold seal coating on the exposed, inside, face of the white OPP ply. The clear OPP ply is reverse printed. Both of these structures present a number of problems. With the laminated structure, when the material is stored in rolls, the cold seal coating lies against the clear OPP outer ply, and it is difficult to prevent the cold seal coating from offsetting onto the outer ply when the material is unrolled. Special measures can be taken when applying the coating to ensure that the coating bonds securely to the white OPP ply, so that it will remain attached to that ply and not offset onto the outer ply. However, such measures increase the cost and complication of manufacture. The lacquer in the single-ply structure can be formulated to act as a release layer, but previously used lacquers often contain mobile additives. Such additives may poison the cold seal coating while the packaging material is stored in rolls and the cold seal coating is in contact with the lacquer, or may migrate through the packaging and contaminate the contents in use. Such lacquers are also not very stable, and have a limited life, because of the loss of volatile or migratory components.

SUMMARY OF THE INVENTION

The present invention relates to a packaging material that avoids, or at least reduces, some of the problems of the previously proposed materials.

In one aspect, the invention provides a packaging material, and a method of making such a material. A substrate comprises at least one sheet of plastic material. An energy-curable coating is applied to one side of the substrate, which will be the outside of the eventual package. The energy-curable coating is cured by exposing it to a suitable energy. A cold-seal cohesive coating is applied to the other side of the substrate.

The substrate may be printed with ink and the ink covered and protected by the energy-cured coating. This structure replaces a laminated structure that incorporates a clear outer ply which is printed on the inside of that ply or the facing surface of the next ply.

In another aspect of the invention, a package is formed from the packaging material. Portions of the inside surface of at least one sheet of the material having the cold-seal cohesive coating on them are pressed together to form a seal.

Preferably, the cold-seal cohesive coating is applied only to those portions of the material that are to form seams in the eventual package.

Preferably, the energy-curable coating is a coating that is cross-linked when irradiated with an electron beam.

The foregoing and other features and advantages of the present invention will become more apparent in light of the following detailed description of the preferred embodiments thereof, as illustrated in the accompanying figures.

DETAILED DESCRIPTIONS OF THE DRAWINGS

Figure 1:
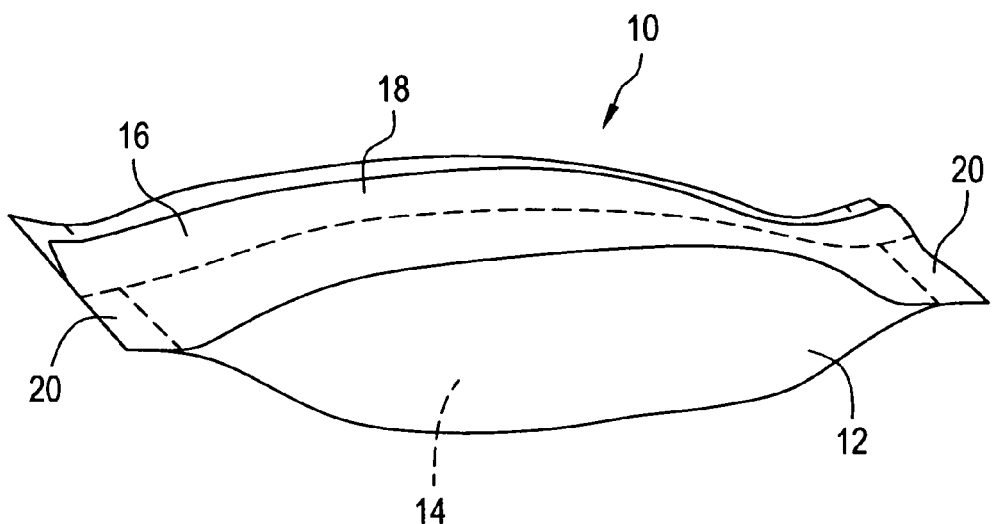
FIG. 1 is an oblique view of a package according to the present invention.

Referring to the drawings, and initially to FIG. 1, one form of package according to the present invention is shown and indicated generally by the reference numeral 10. The package 10 comprises a sheet 12 of packaging material, enclosing contents 14, which may be a candy bar. As shown in FIG. 1, the sheet 12 is wrapped round the contents 14, and its side edges are turned up to form flanges 16, which are joined and sealed together with their inside surfaces face-to-face by a cold seal 18, to form a generally tubular shape. The ends of the tube are flattened, and joined and sealed together by cold seals 20. A storage space, containing the contents 14, is thus defined by the area within the sheet 12 and within the seals 18 and 20. The storage space is sealed off from the surrounding environment.

If the contents 14 are a solid object such as a candy bar, the package may be formed round the contents, substantially in the order in which it has been described. If the contents 14 are loose objects such as small pieces of candy, then the package may be formed into a bag, by sealing the longitudinal seal 18 and one end seal 20, filled, and then closed by sealing the other end seal 20. In either case, the material for the sheet 12 may be provided in the form of a long strip, with the flanges 16 formed by the side edges of the sheet, and may be cut into lengths immediately before, or after, the end seals 20 are formed. Machines for forming and sealing such packages are available commercially, and the process will not be further described here.

Figure 2:
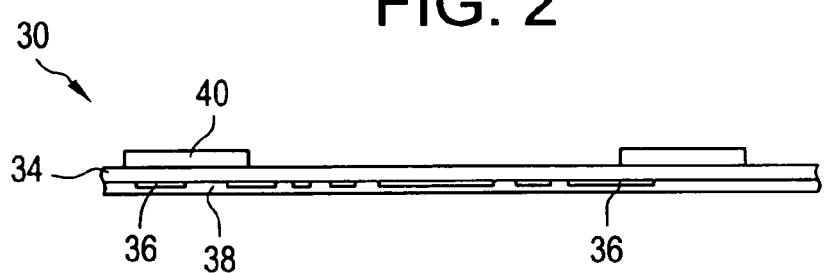
FIG. 2 is a cross-section through one embodiment of packaging material according to the invention.
Figure 3:
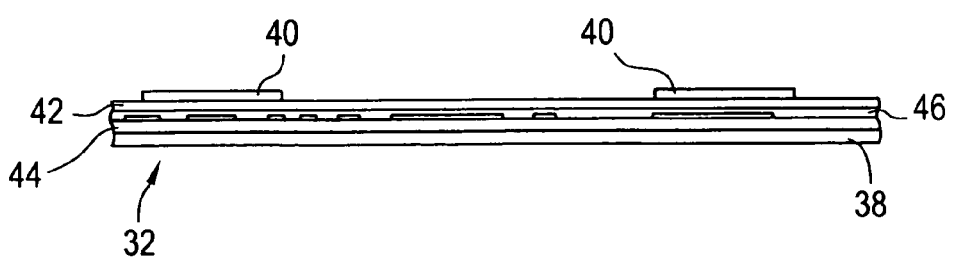
FIG. 3 is a cross-section through another embodiment of packaging material according to the invention.

The sheet 12 of the package 10 can be manufactured from a structure as shown in FIG. 2 based on a single ply of plastic material, or from a laminate structure as shown in FIG. 3.

Referring now to FIG. 2, the first form of packaging material has a substrate consisting of a single ply 34 of white oriented polypropylene (OPP) material. Ink printing 36 is applied to the outer surface of the OPP ply 34. As shown in FIG. 2, the ink is applied in discrete areas, allowing the white color of the OPP ply 34 to be seen as a background, but it may instead be applied in a continuous layer. The ink may be a conventional ink suitable for printing on OPP and may be applied by printing processes known for the purpose.

The outside of the OPP ply 34 is covered, over the printing 36, with a layer of electron-beam curable (EB) coating 38, which will be described in more detail below. The coating 38 is cured immediately after being applied. It forms a protective layer, preventing the printing from becoming smudged or abraded in handling, and also serves as a release layer for the cold seal coating to be discussed below.

A cold seal coating 40 is applied to the inside surface of the white OPP ply 34. The cold seal coating 40 may be a continuous layer, but preferably, as shown in FIG. 2, it is pattern-applied at only those places where a seal is to be formed. That entails maintaining register between the back side with the cold seal coating and the front side with the printing. Preferably, the cold seal coating machine is a flexographic or rotogravure printing machine forming part of the same production line as, and is mechanically synchronized with, the printing press for the ink printing 36. Flexographic and rotogravure printing machines are well known in the art and, in the interests of conciseness, will not be described here. The package forming and cutting machine can then be kept in register with the cold seal pattern in exactly the same way as it is kept in register with the ink printing on the other side of the material. Instead, the ink printing 36 may be applied first, and the cold seal coating machine and the package forming and cutting machine may separately be kept in register with the printing. Methods of, and apparatus for, keeping subsequent machines in register with a printed pattern are well known in the art and, in the interests of conciseness, will not be described here. Pattern-applying the cold seal has the advantages that far less cold seal coating is used, and that the cold seal coating does not contact the contents of the package 10, or does so only along very narrow areas at the seams. Pattern-applying the cold seal 40 will be necessary for some uses, especially food uses, where more than minimal contact between the contents 14 of the package 10 and the cold seal coating 40 will not be acceptable.

Referring now to FIG. 3, the second form of packaging material has a substrate comprising a laminate of an inner ply 42 of white OPP material and an outer ply 44 of clear OPP material, laminated together by a layer 46 of a suitable adhesive. The ink printing 36 is applied to the inner surface of the outer OPP ply 44. As with the first form of material shown in FIG. 2, the ink is applied in discrete areas, allowing the white color of the inner OPP ply 42 to be seen as a background, but it may instead be applied in a continuous layer. Instead, the ink printing 36 may be applied to the outer surface of the inner OPP ply 42, provided that the adhesive 46 is sufficiently clear that it will not obscure the printing.

The outside of the outer OPP ply 44 is covered with a layer of EB coating 38. In this structure it is not needed to protect the ink 36, but it forms a protective layer for the outer surface of the OPP laminate, and serves as a release layer for the cold seal coating to be discussed below.

The adhesive 46 is a solvent based adhesive based on two aliphatic component materials that have the chemical composition of a polyol and an isocyanate. Both of these components can be based on chemicals that are low enough in molecular weight to be applied to the films without needing solvents for dilution and application. The chemical constituents are still found to be 21 C.F.R. § 177.1390 and § 175.105 approved where needed within the package, and so may be used in food packaging.

The cold-seal coating 40 used in either form of the packaging material shown in FIGS. 2 and 3 may be based on rubber latex, but is preferably based on uncured isoprene or styrene butadiene rubber. These synthetic rubbers are more stable than natural rubber, allowing a material with a longer life, are more consistent, and do not present the risk of allergic reactions, and even anaphylactic shock, experienced by some people with natural latex products. The coating 40 is preferably a cohesive material. A cohesive material is defined as a material that adheres strongly to another surface of the same material and only weakly to other surfaces, and that when peeled apart fails primarily by separating at the interface between the two cohesive coatings, rather than by either coating detaching from its substrate. In order to ensure adhesion of the coating 40 to its substrate, approximately 20% of acrylate or ethylene vinyl acetate monomers may be added to the coating material, to act as a surfactant and adhesive. For application, the coating 40 is formed into an emulsion with water, at a consistency that can be applied with a conventional rotogravure printing press. The coating is applied at a thickness of 5 to 7 microns (about 0.2 to 0.3 mils).

In either of the packaging materials 30 or 32, the electron beam curable coating 38 may comprise a number of species of suitable compounds. The materials best suited for the coating 40 are a combination of oligomers and monomers. The preferred oligomer is an epoxy acrylate. The preferred monomer is acrylate. The monomers act as diluents, used to reduce the viscosity of the coating for purposes of application. The concentration of monomer may be adjusted to provide a wide range of viscosity, such that many coating systems may be employed to apply the EB coating.

The electron beam curable coating 40 is cured using a suitable electron beam source. Suitable electron beam sources may be obtained commercially from Energy Science, Inc. of Wilmington, Mass. The electron energy output should be within the range of 110 kV to 135 kV at a dosage of 2.5 to 5.0 megarads. Preferably, the energy is within the range of 125 kV to 135 kV at a dosage of 3.0 to 4.0 megarads.

When exposed to an electron beam from a suitable source, acrylate monomer reacts into the epoxy acrylate chain to form cross-links. The cross-linking requires no initiator compounds. Therefore no residual volatile organic compounds are present in the finished product. Curing is substantially instantaneous and provides a cure percentage at or near one hundred percent.

Various desirable additives, the exact nature of which will depend on the specifications of the packaging material 30 or 32, may also be added. Often, defoamers and slip agents are desirable. Additives may also be provided to improve qualities such as the coefficient of friction, gloss, and processing qualities. The additives included in the EB coating 40 tend to become "reacted-in" during polymerization of the coating. For example, slip agents provided to improve the coefficient of friction are fixed in the cross-linking process, and are therefore not so susceptible to the problems associated with migration. It is thus possible to use a wider range of additives, and thus to achieve unexpectedly greater control of the properties of the external surface of the packaging, than was possible with previously used lacquer coatings.

Although the invention has been described and illustrated with respect to the exemplary embodiments thereof, it should be understood by those skilled in the art that the foregoing and various other changes, omissions, and additions may be made therein and thereto, without parting from the spirit and scope of the present invention.

What is claimed is:

1. A packaging material comprising:
   a substrate comprising at least one sheet of plastic material; the substrate having an inner surface and an outer surface;
   a cold-seal cohesive coating on at least a portion of the inner surface of the substrate; and
   an energy-cured crosslinked release layer on the outer surface of the substrate, the release layer comprising a reacted-in slip agent, the release layer providing a surface for temporary adhesion of the cohesive without blocking of the cohesive upon removal of the cohesive from the release layer.

2. A packaging material according to claim 1, further comprising printing on an outer surface of the substrate covered by the energy-cured release layer.

3. A packaging material according to claim 1, wherein the cold-seal cohesive coating comprises natural rubber latex, styrene butadiene, isoprene or synthetic rubber.

4. A packaging material according to claim 1, wherein the cold-seal cohesive coating comprises a minor proportion of acrylate or ethyl vinyl acetate.

5. A packaging material according to claim 1, wherein the cold-seal cohesive coating is applied only over selected portions of the inner surface of the substrate.

6. A packaging material according to claim 1, wherein the energy cured release layer is an electron-beam cured coating.

7. A packaging material according to claim 1, wherein the energy cured release layer is a cross-linked epoxy acrylate coating.

8. A packaging material according to claim 1, wherein the substrate comprises a laminate of at least two sheets of plastic material, one sheet being an outer sheet and the second sheet being an inner sheet.

9. A according to claim 8, wherein an outer sheet of the laminate is clear, and further comprising printing on a surface between the outer sheet and an adjacent sheet.

10. A package comprising:
   at least one sheet of flexible packaging material comprising,
      a substrate comprising at least one sheet of plastic material,
      a cold-seal cohesive on one or more portions of an inner side of the substrate, and
      an energy-cured crosslinked release coating on an outer side of the substrate, the energy-cured coating comprising a reacted-in slip agent, the energy-cured coating serving as a release layer for the cold-seal cohesive so that the cold-seal cohesive remains attached to the inner side of the substrate and does not offset onto the energy-cured coating when the material is unrolled after being stored in a roll;
   wherein said package has at least one seam formed by said cold-seal cohesive on the one or more portions of the inner side of the substrate cohering together.

11. A package according to claim 10, further comprising printing on an outer surface of the substrate which is covered by the energy-cured coating.

12. A package according to claim 10, wherein the cold-seal cohesive is applied only over selected portions of the inner surface of the substrate.

13. A package according to claim 10, wherein said cold-seal cohesive is applied to the inner surface of said substrate only on the portion of the inner surface that forms the seam.

14. A package according to claim 10, wherein the energy cured coating is an electron-beam cured coating.

15. A package according to claim 10, wherein the energy cured coating is a cross-linked epoxy acrylate coating.

16. A package according to claim 10, wherein the substrate comprises a laminate of at least two sheets of plastic material forming an outer sheet and an inner sheet.

17. A package according to claim 16, wherein an outer sheet of the laminate is clear, and further comprising printing between the outer sheet and the inner sheet.

18. A package according to claim 10, wherein the cold-seal cohesive comprises natural rubber latex, styrene butadiene, isoprene or synthetic rubber.

19. A package according to claim 18, wherein the cold-seal cohesive comprises a minor proportion of acrylate or ethyl vinyl acetate.

20. A packaging material comprising:
   a substrate formed from a flexible plastic material, the substrate having an inner surface and an outer surface;
   a cold-seal cohesive applied to one or more portions of the substrate surfaces, the cohesive adapted to seal the substrate portions together in forming the package;
   an electron beam energy cured crosslinked release coating on the outer surface of the substrate, the coating serving as a release layer for the cohesive upon contact between the coating and the cohesive such that the cohesive temporarily adheres to the coating and releases upon removal without adversely affecting the adhesive properties of the cohesive;
   ink printed in a pattern on the outer surface of the substrate and covered by the coating, the coating providing a glossy surface for the ink and the package; and
   a reacted-in slip agent within the coating.

* * * * *